(12) United States Patent
McBride

(10) Patent No.: US 9,038,281 B1
(45) Date of Patent: *May 26, 2015

(54) APPARATUS FOR ALIGNING A WIND TURBINE GENERATOR

(71) Applicant: Matthew J. McBride, Pecos, TX (US)

(72) Inventor: Matthew J. McBride, Pecos, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/231,093

(22) Filed: Mar. 31, 2014

Related U.S. Application Data

(63) Continuation of application No. 13/493,868, filed on Jun. 11, 2012, now Pat. No. 8,683,708.

(51) Int. Cl.
*G01B 5/24* (2006.01)
*B25B 29/00* (2006.01)

(52) U.S. Cl.
CPC ..................................... *B25B 29/00* (2013.01)

(58) Field of Classification Search
USPC ............ 33/412, 645, 520, 529, 533, 661, 613
See application file for complete search history.

(56) References Cited

U.S. PATENT DOCUMENTS

| | | |
|---|---|---|
| 3,762,068 A | 10/1973 | Clay |
| 4,161,068 A | 7/1979 | McMaster |
| 4,356,635 A | 11/1982 | Chung |
| 4,570,168 A | 2/1986 | Sjordal et al. |
| 4,709,485 A | 12/1987 | Bowman |
| 4,989,340 A | 2/1991 | Dawson |
| 5,479,718 A | 1/1996 | Cook |
| 5,517,464 A | 5/1996 | Lerner et al. |
| 5,896,672 A | 4/1999 | Harris |
| 5,920,999 A | 7/1999 | Hutter |
| 5,987,767 A | 11/1999 | Roddie |
| 6,148,533 A | 11/2000 | Hutter |
| 6,161,296 A | 12/2000 | Davio |
| 6,574,878 B2 | 6/2003 | Cross |
| 6,651,353 B1 | 11/2003 | Evans et al. |
| 6,784,986 B2 | 8/2004 | Lysen et al. |
| 7,111,407 B2 | 9/2006 | Jones |
| 7,460,977 B2 | 12/2008 | Stromberg et al. |
| 7,484,312 B2 | 2/2009 | Morgan |
| 8,043,048 B2 * | 10/2011 | Daniels et al. ................ 415/118 |
| 8,196,304 B1 | 6/2012 | McBride |
| 8,683,708 B2 * | 4/2014 | Mcbride ......................... 33/412 |
| 2011/0131898 A1 | 6/2011 | Nies et al. |
| 2012/0023864 A1 | 2/2012 | Zheng et al. |
| 2012/0131809 A1 | 5/2012 | Sahm |
| 2012/0246951 A1 | 10/2012 | McBride |

* cited by examiner

*Primary Examiner* — Yaritza Guadalupe-McCall

(74) *Attorney, Agent, or Firm* — Hall Estill Attorneys at Law; Daniel P. Dooley

(57) ABSTRACT

An apparatus for aligning a wind turbine generator is disclosed. Preferably, the apparatus includes at least, but is not limited to, a support flange engaging a securement stud via a securement aperture, and a force displacement plate contacting the support flange. The preferred apparatus further includes an indexing means attached to the securement stud and force displacement plate, the indexing means configured to translate a rotational force to linear force capable of moving the support flange in relation to the securement stud.

16 Claims, 5 Drawing Sheets

APPARATUS FOR ALIGNING A WIND TURBINE GENERATOR

CROSS REFERENCE TO RELATED APPLICATIONS

This application is a continuation of copending U.S. patent application Ser. No. 13/493,868 filed Jun. 11, 2012 which claims the benefit of priority to and is a Patent Application of U.S. patent application Ser. No. 12/566,422 filed Sep. 9, 2009, now U.S. Pat. No. 8,196,304 issued on Jun. 12, 2012, which claims the benefit of priority to and is a Patent Application of U.S. Provisional patent application Ser. No. 61/095,520, entitled "Method For Aligning A Wind Turbine Generator," filed Sep. 9, 2008. The aforementioned provisional patent application has not been assigned and the ownership resides solely with the inventor, and the entirety of the aforementioned patent application is incorporated herein by reference for all purposes.

FIELD OF THE INVENTION

This invention relates to new and useful improvements in wind turbine generator maintenance. In particular, but not by way of limitation, those improvements relate to an apparatus for aligning an input shaft of a wind turbine generator with a corresponding output shaft of a wind turbine.

BACKGROUND

Wind turbine generators for generating electric power using wind power, which is a natural form of energy, are known. Such a wind turbine generator includes a nacelle disposed on a tower. The nacelle includes a rotor head equipped with blades, a main shaft connected to the rotor head so as to integrally rotate with the rotor head, a gearbox connected to the main shaft that rotates upon receiving the wind power supplied to the blades, and a generator driven by a shaft output from the gearbox. According to the wind turbine generator having this structure, the rotor head is equipped with the blades which convert wind power into a rotational force, and the main shaft rotates to generate a shaft output. The rotational speed is increased via the gearbox connected to the main shaft and the resulting shaft output is transmitted to the generator. Consequently, the shaft output obtained by converting the wind power into the rotational force is used as a driving source of the generator, and thus power generation can be performed using the wind power as motive power for the generator.

Since recent wind turbine generators tend to increase their output by increasing the size thereof, the sizes of components such as the rotor head, the main shaft, the gearbox, and the generator also increase, resulting in an increase in weight, and an increase in the need to assure alignment between the gearbox shaft and the generator main shaft. Misalignment can lead to premature and costly failures of the system, as well as loss in income due to the inability to generate energy.

Accordingly, as market pressures continue to demand wind turbine systems that provide lower cost, greater reliability, and longer service lives, challenges remain and a need persists for improvements in methods and apparatuses for use in the maintenance of wind turbine systems.

SUMMARY OF THE INVENTION

In accordance with an embodiment, an apparatus for aligning a wind turbine generator is provided. Preferably, the apparatus includes at least, but is not limited to, a support flange engaging a securement stud via a securement aperture, and a force displacement plate contacting the support flange. The preferred apparatus further includes an indexing means attached to the securement stud and force displacement plate, the indexing means configured to translate a rotational force to linear force capable of moving the support flange in relation to the securement stud.

These and various other features and advantages that characterize the claimed invention will be apparent upon reading the following detailed description and upon review of the associated drawings.

DESCRIPTION OF THE PREFERRED EMBODIMENTS

Reference will now be made in detail to one or more examples of the invention depicted in the figures. Each example is provided by way of explanation of the invention, and not meant as a limitation of the invention. For example, features illustrated or described as part of one embodiment may be used with another embodiment to yield still a different embodiment. Other modifications and variations to the described embodiments are also contemplated within the scope and spirit of the invention.

Figure 1:
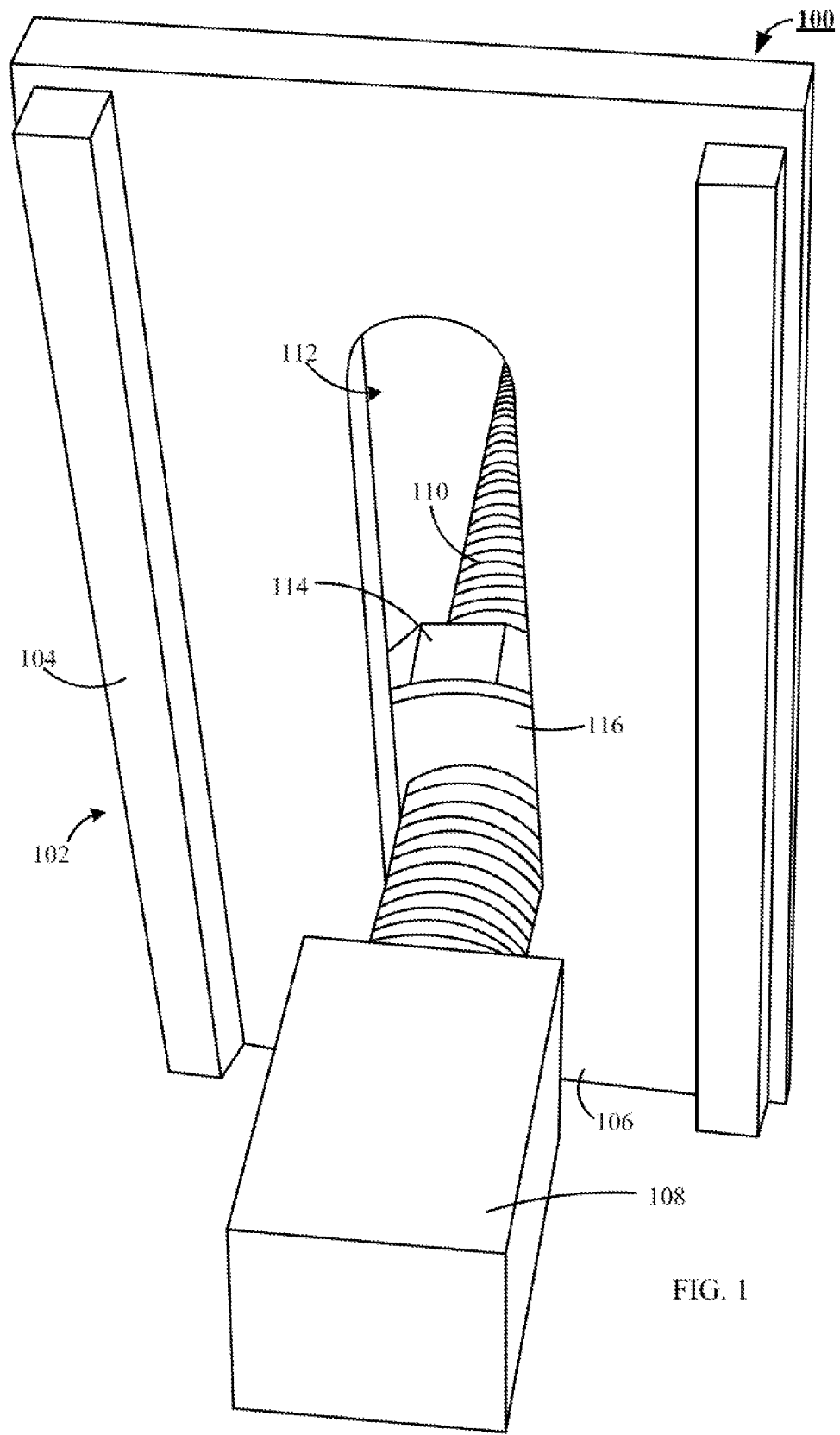
FIG. 1 shows a front perspective view of a preferred embodiment of the inventive wind turbine generator alignment tool.

Referring to the drawings, FIG. 1 shows a preferred embodiment of an inventive wind turbine generator alignment tool 100) that includes a push plate 102 formed by a pair of push rails 104 secured to a force displacement plate 106, an end effector 108 interacting with a link member 110, which passes through an engagement aperture 112 of the force displacement plate 106. The preferred embodiment of the wind turbine generator alignment tool 100, when the end effector 108 is secured in its operative position, an indexing means 114 is threaded onto the link member 110, a force displacement means 116 is passed over the link member 110 and into adjacency with the indexing means 114, and the link member 110 is passed through the engagement aperture 112 and threaded into the end effector 108.

Figure 2:
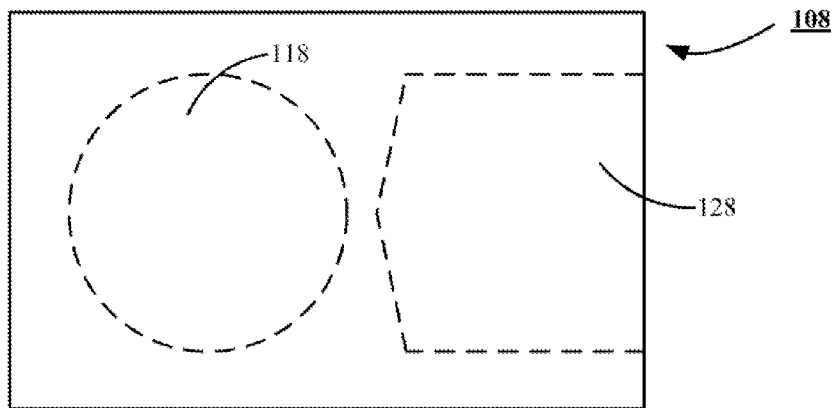
FIG. 2 shows a top plan view of an end effector of the inventive wind turbine generator alignment tool of FIG. 1.
Figure 3:
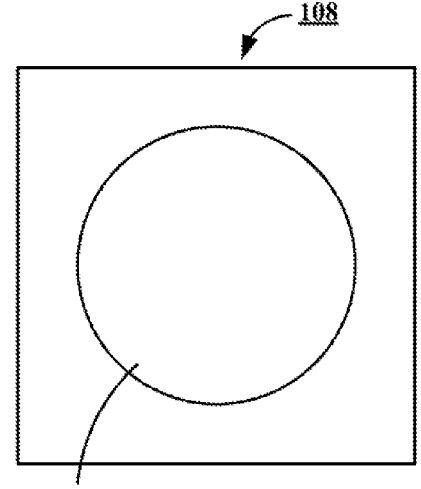
FIG. 3 shows a bottom plan view of the end effector of the inventive wind turbine generator alignment tool of FIG. 1.
Figure 4:
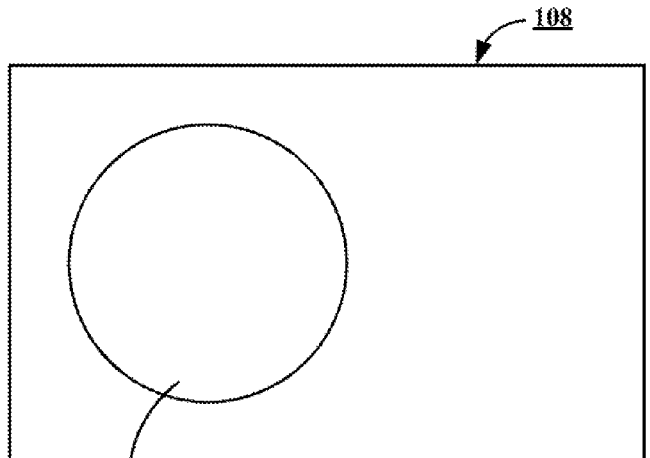
FIG. 4 shows an end view in elevation of the end effector of the inventive wind turbine generator alignment tool of FIG. 1.

FIGS. 2, 3, 4, and 5 collectively show a plurality of views of the preferred end effector 108, and are best viewed collectively for an enhanced understanding of the end effector 108. Shown in dotted lines by FIG. 2 are a securement stud attachment aperture 118 and a link member attachment aperture 120 provided by the end effector 108. FIG. 3 shows an end view of the link member aperture 120, while FIG. 4 shows a bottom view of the securement stud attachment aperture 118.

Figure 5:
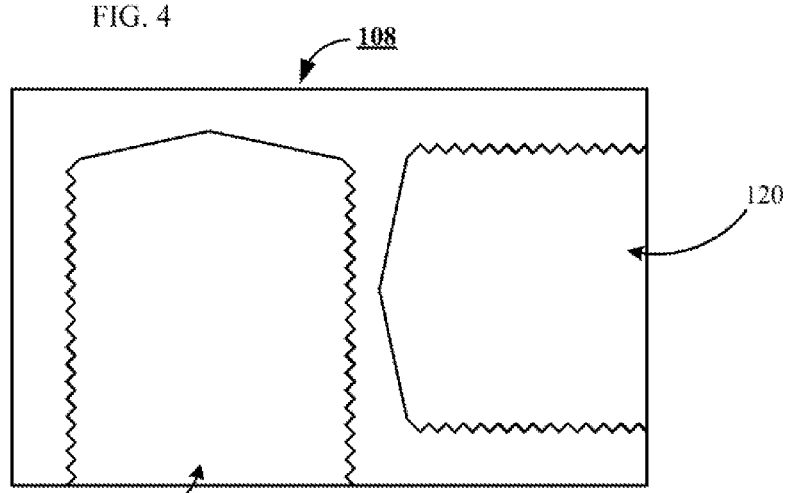
FIG. 5 shows a cross section view in elevation of the end effector of the inventive wind turbine generator alignment tool of FIG. 1.

FIG. 5 shows a cross-section of the end effector 108 revealing that both the securement stud attachment aperture 118, and the link member aperture 120 are preferably threaded to accommodate engagement of the end effector onto a securement stud 122 (see FIG. 9), and the engagement of the link member 110. It will be noted that in a preferred embodiment of the end effector 108, the link member aperture 120 may be used to interact with the securement stud 122, while the securement stud attachment aperture 118 may be used to interact with the link member 110.

Figure 6:
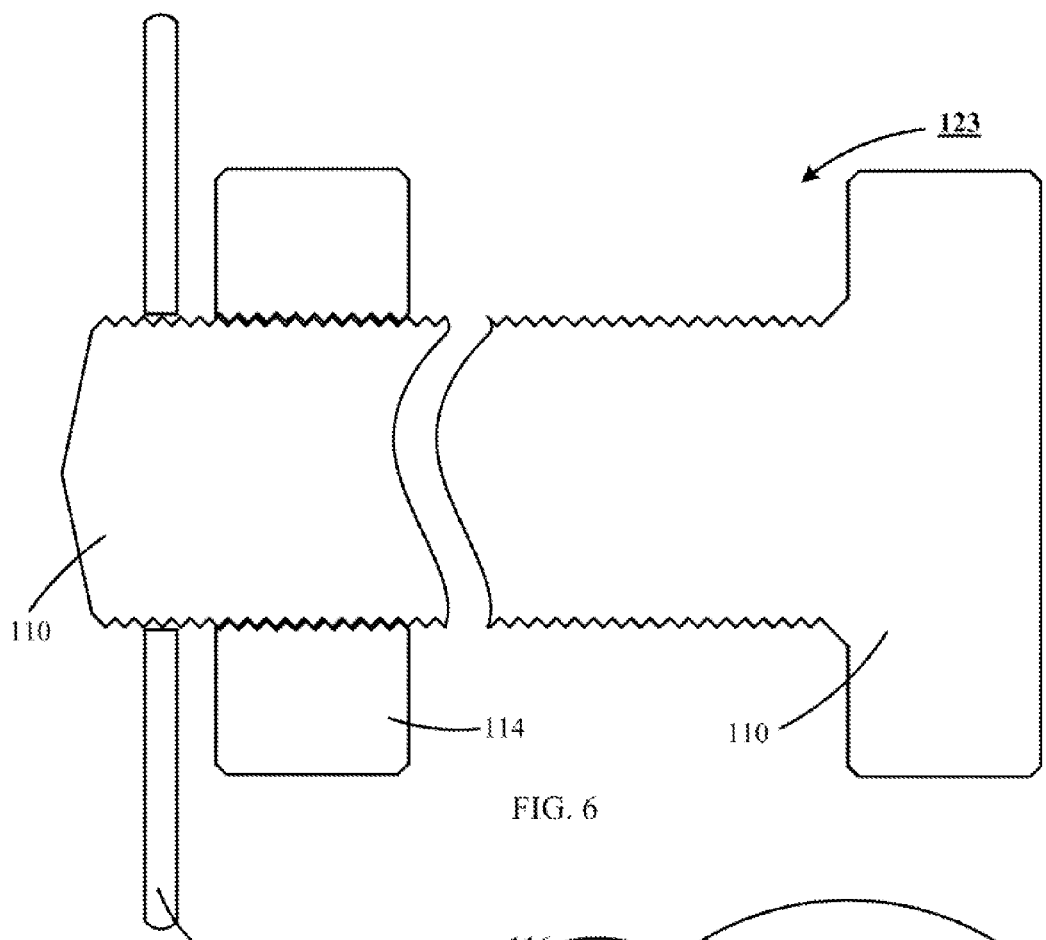
FIG. 6 shows a cross-section side elevation view in partial cutaway of an alignment mechanism that includes an alignment link communicating with an indexing means adjacent a force distribution means of the inventive wind turbine generator alignment tool of FIG. 1.
Figure 7:
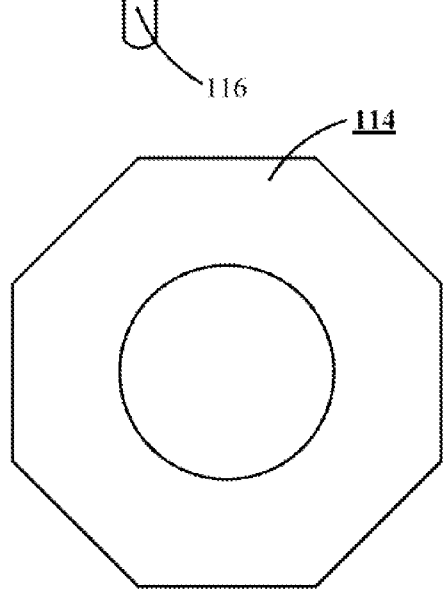
FIG. 7 shows an end view in elevation of the indexing means of FIG. 6.
Figure 8:
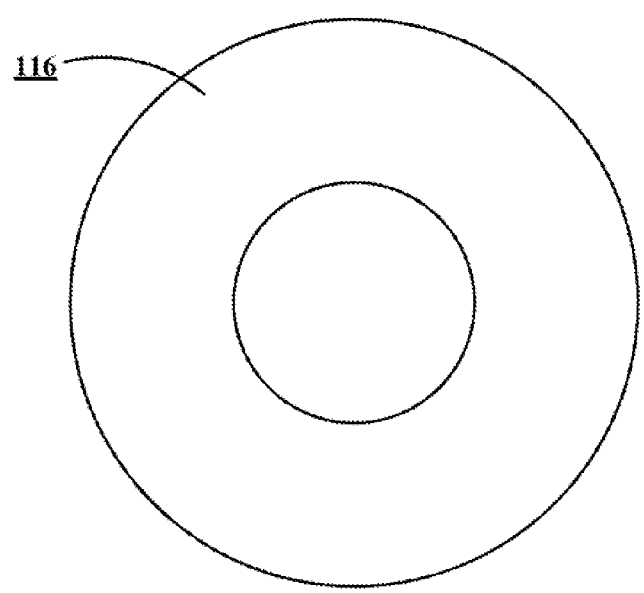
FIG. 8 shows an end view in elevation of the force distribution means of FIG. 6.

FIG. 6 shows a preferred alignment mechanism 123 in cross-section that includes the alignment link 110 communicating with the indexing means 114, which is adjacent the force distribution means 116 of the inventive wind turbine generator alignment tool 100 of FIG. 1. FIG. 7 shows the indexing means 114 in side elevational view, and FIG. 8 shows the force distribution means 116 in side elevational view.

Figure 9:
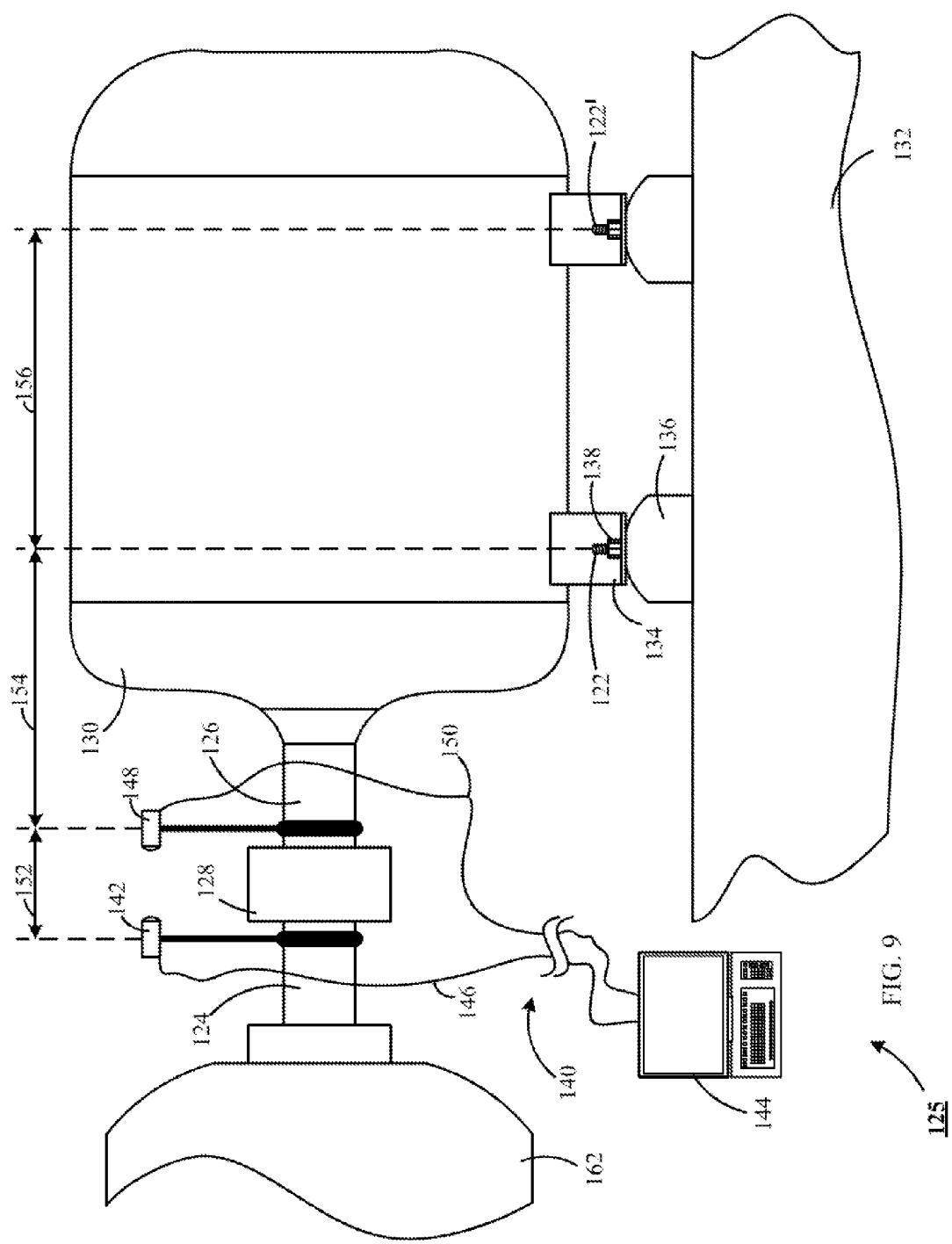
FIG. 9 shows a side elevation view in partial cutaway of a preferred embodiment wind turbine generator with a misalignment measurement device attached thereto.

Moving to FIG. 9, illustrated therein is a preferred wind powered electric generating system 125, which includes a wind turbine output shaft 124 secured to a wind turbine generator input shaft 126 by a flexible coupling 128. In a preferred embodiment, a wind turbine generator 130 supporting the wind turbine generator input shaft 126 is secured to a generator platform 132 by a plurality of securement studs 122. Preferably, a plurality of support flanges 134, corresponding to each of the plurality of securement studs 122 are attached to the generator 130. Each support flange 134 is preferably isolated from the generator platform 132 by a corresponding isolation pad 136, and held under a compressive load adjacent its associated isolation pad 136 by a flange retainer 138.

During operation of the wind powered electric generating system 125, misalignment between the wind turbine output shaft 124 and the wind turbine generator input shaft 126 may occur, necessitating a realignment of the wind turbine output shall 124 with the wind turbine generator input shaft 126. To determine the presence and severity of such a misalignment, a misalignment measurement device 140 is preferably used. In a preferred embodiment, the misalignment measurement device 140 includes a first sensor 142, linked to a processor 144 by a first communication cable 146, and a second sensor 148 linked to the processor 144 by a second communication cable 150. However, those skilled in the art will understand that the communication cables 146 and 150 are provided as one form of communication linkage between the sensors 142 and 148, wireless communication between the sensors 142 and 148 and the processor 144 is also contemplated by the present invention.

Use of the preferred misalignment measurement device 140, entails a determination of particular distances such as 152, taken between the first sensor 142 and the second sensor 148; 154, taken between the second sensor 148 and a first securement stud 122; and 156, taken between the first securement stud 122 and the second securement stud 122'. The angular relationship between the first and second sensors 142, 148, as the sensors are rotated about the path of rotation of the flexible coupling 128, and relative to the determined distances 152, 154, and 156, are used by the processor 144 to calculate the amount of operative misalignment when an operative misalignment is present between the wind turbine output shaft 124 and the wind turbine generator input shaft 126.

Figure 10:
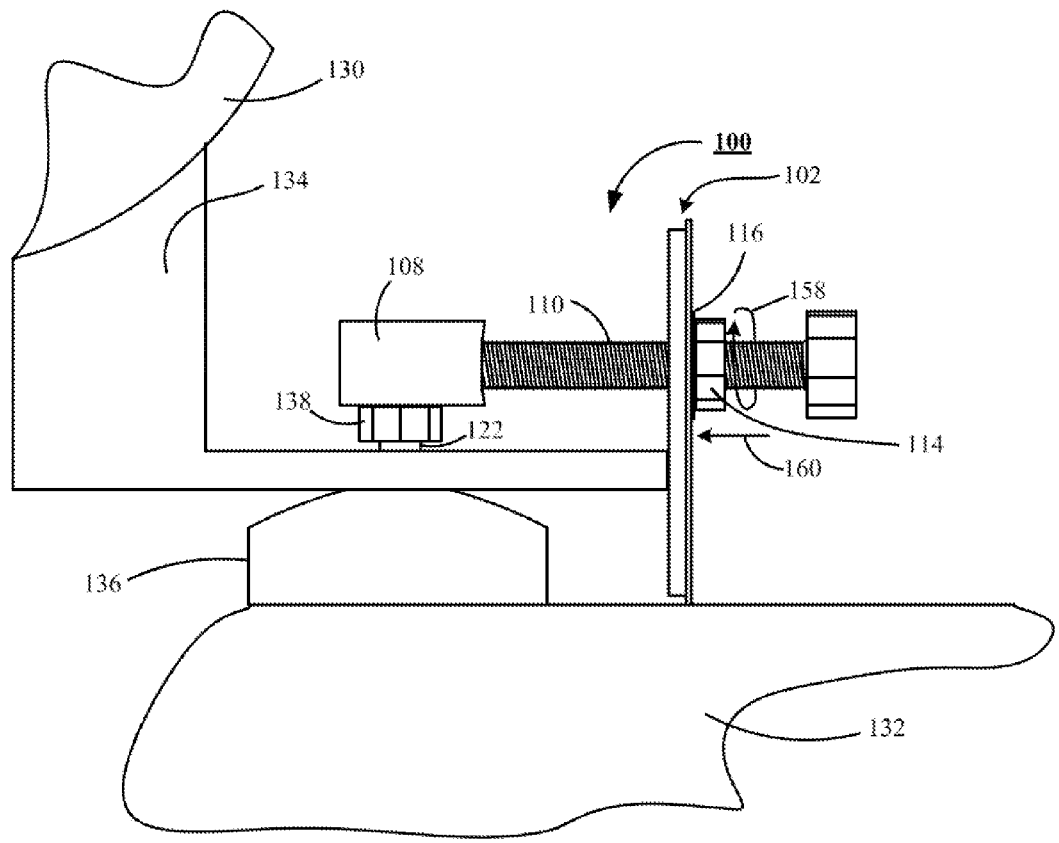
FIG. 10 shows a side elevation view of the inventive wind turbine generator alignment tool of FIG. 1 mounted in an operative position adjacent a wind turbine generator.

FIG. 10 depicts the flange retainer 138, backed off from the support flange 134 in preparation for realignment of the generator 130 by the inventive wind turbine generator alignment tool 100. With the push plate 102 in abutting adjacency with the flange 134, advancement of the indexing means 114 along the link member 110 translates an applied rotational force 158 into a linear force 160, which shifts the position of the support flange 134 relative to the securement stud 122 to align the wind turbine generator input shaft 126 with the wind turbine output shaft 124 (each of FIG. 6).

Figure 11:
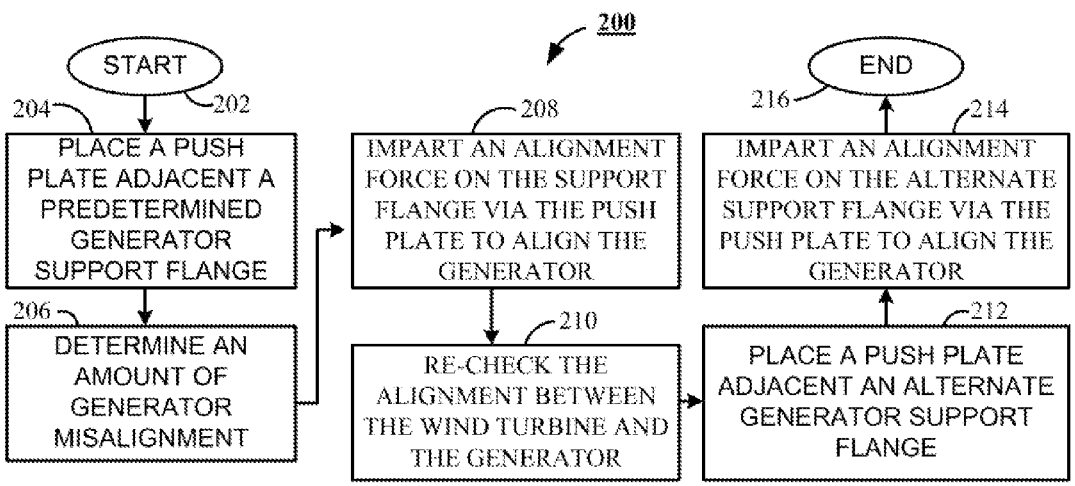
FIG. 11 shows a flowchart of a method of using the inventive wind turbine generator alignment tool of FIG. 1.

Turning to FIG. 11, shown therein is a flow chart 200, which depicts a method of utilizing an inventive wind turbine generator alignment tool (such as 100). The method commences at start process step 202 and proceeds to process step 204 with a placement of a push plate (such as 102) in abutting adjacency with a predetermined generator support flange (such as 134). At process step 206, the method continues with determining an amount of generator misalignment, and at process step 208, an alignment force (such as 160) to align a generator (such as 130) is applied to the predetermined support flange via an application of a rotational force (such as 158) to an index means (such as 114) to align an input shaft (such as 126) of a wind turbine generator (such as 130) with an output shaft (such as 124) of a wind turbine (such as 162 of FIG. 9).

At process step 210, alignment between the generator and the wind turbine is re-checked to assure alignment between the wind turbine and the generator has been attained, relative to the support flange being acted upon. At process step 212, the push plate is secured in abutting adjacency with an alternate predetermined support flange. When the inventive wind turbine generator alignment tool is securely in position adjacent the alternate predetermined support flange, a second alignment force (such as 160), to align the generator is applied to the alternate predetermined support flange via an application of a second rotational force (such as 158) to the index means to align the input shaft of the wind turbine generator with the output shaft of the wind turbine, and the process concludes at end process step 216.

With respect to the above description, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

It will be clear that the present invention is well adapted to attain the ends and advantages mentioned as well as those inherent therein. While presently preferred embodiments have been described for purposes of this disclosure, numerous changes may be made which will readily suggest themselves to those skilled in the art and which are encompassed by the appended claims.

What is claimed is:

1. An apparatus for aligning a wind turbine generator comprising:
   a support flange engaging a securement stud via a securement aperture;

a force displacement plate contacting the support flange; and an indexing means attached to the securement stud and force displacement plate, the indexing means configured to translate a rotational force to linear force capable of moving the support flange in relation to the securement stud.

2. The apparatus for aligning a wind turbine generator of claim 1, in which the indexing means comprises a threaded bolt.

3. The apparatus for aligning a wind turbine generator of claim 2, in which the indexing means comprises a threaded nut concurrently contacting the threaded bolt and force displacement plate.

4. The apparatus for aligning a wind turbine generator of claim 3, in which the indexing means comprises an end effector connecting the securement stud and threaded bolt.

5. The apparatus for aligning a wind turbine generator of claim 4, in which the threaded nut engages a first side of the force displacement plate, opposite the end effector.

6. The apparatus for aligning a wind turbine generator of claim 3, in which a force displacement means is disposed between the threaded nut and the force displacement plate.

7. The apparatus for aligning a wind turbine generator of claim 1, in which the force displacement plate comprises at least a first push plate continuously extending along a second side of the force displacement plate.

8. The apparatus for aligning a wind turbine generator of claim 7, in which a second push plate continuously extends along the second side of the force displacement plate.

9. The apparatus for aligning a wind turbine generator of claim 8, in which the first and second push plates are symmetrically positioned about an engagement aperture.

10. The apparatus for aligning a wind turbine generator of claim 1, in which the indexing means continuously extends through an engagement aperture of the force displacement plate.

11. A tool comprising:
a support flange engaging a securement stud via an aperture;
a force displacement plate contacting the support flange; and
an indexing means attached to the securement stud and force displacement plate exclusive of contact with the support flange, the indexing means configured to translate a rotational force to linear force capable of moving the support flange in relation to the securement stud.

12. The tool of claim 11, in which the support flange extends from a wind turbine generator.

13. The tool of claim 11, in which the indexing means comprises a threaded bolt engaging the securement stud via an end effector and engaging the force displacement plate via an engagement aperture and a threaded nut.

14. The tool of claim 13, in which the end effector has first and second attachment apertures oriented orthogonal to one another.

15. The tool of claim 14, in which the first and second attachment apertures are each threaded.

16. The tool of claim 14, in which the force displacement plate is configured to exclusively contact the support flange and indexing means.

\* \* \* \* \*